United States Patent [19]

Wada et al.

[11] Patent Number: 5,647,223
[45] Date of Patent: Jul. 15, 1997

[54] CONTROL DEVICE FOR AIR CONDITIONER

[75] Inventors: Kunihide Wada; Koichiro Tamakoshi, both of Osaka, Japan

[73] Assignee: Daikin Industries, Ltd., Osaka, Japan

[21] Appl. No.: 564,128

[22] PCT Filed: Apr. 18, 1995

[86] PCT No.: PCT/JP95/00756

§ 371 Date: Dec. 15, 1995

§ 102(e) Date: Dec. 15, 1995

[87] PCT Pub. No.: WO95/28607

PCT Pub. Date: Oct. 26, 1995

[30] Foreign Application Priority Data

Apr. 18, 1994 [JP] Japan .................................. 6-078305

[51] Int. Cl.$^6$ .............................. F25B 7/00; G05D 23/00
[52] U.S. Cl. .............................. 62/175; 165/209; 236/51
[58] Field of Search ............................. 62/175; 236/51; 165/208, 207, 209

[56] References Cited

U.S. PATENT DOCUMENTS

| | | | |
|---|---|---|---|
| 4,931,948 | 6/1990 | Parker et al. | 165/208 X |
| 5,279,458 | 1/1994 | De Wolf et al. | 165/209 X |
| 5,383,336 | 1/1995 | Nichida et al. | 165/207 X |

FOREIGN PATENT DOCUMENTS

| | | |
|---|---|---|
| 1263450 | 10/1989 | Japan . |
| 2166336 | 6/1990 | Japan . |
| 2131152 | 10/1990 | Japan . |
| 3204537 | 9/1991 | Japan . |
| 6147605 | 5/1994 | Japan . |
| 6323611 | 11/1994 | Japan . |

*Primary Examiner*—William E. Wayner
*Attorney, Agent, or Firm*—Sixbey, Friedman, Leedom & Ferguson, P.C.; Gerald J. Ferguson, Jr.

[57] ABSTRACT

A plurality of remote control groups (GR) each have a plurality of indoor units (20, 20, . . . ) designated as a single master unit (2a) and as slave units (2b) cooperating with the master unit (2a). A central monitor board (30) is provided for communicating control signals with each of the indoor units (20, 20, . . . ). A memory of the central monitor board (30) has a type area (M2) for storing type data representing that each indoor unit is a master unit (2a) or a slave unit (2b). The central monitor board (30) transmits a start signal to the indoor unit (20) as a master unit (2a) in accordance with type data of the type area (M2). In addition, the central monitor board (30) determines that the indoor units (20, 20, . . . ) having begun to operate in response to the start signal belong to one group (GR) and enters the determination result in a group area (M3) of the memory.

2 Claims, 6 Drawing Sheets

CONTROL DEVICE FOR AIR CONDITIONER

TECHNICAL FIELD

This invention relates to a control device for air conditioner and particularly relates to measures for entering indoor unit group data on indoor units into a central control unit.

BACKGROUND ART

In conventional air conditioners as disclosed in, for example, Japanese Utility Model Laying Open Gazette No.2-131152, a plurality of indoor units are provided, the plural indoor units are divided into a plurality of groups, at least one group of indoor units is connected to a single operating device and all the indoor units are connected to a centralized controller.

The operating device communicates control signals with each of the connected indoor units to operate the indoor units collectively or individually. The centralized controller communicates control signals with respective master units of the groups to collectively control the indoor units in units of the groups.
Problems to be solved In the above-mentioned air conditioner, the centralized controller communicates control signals for controlling a start, a stop or the like only with the indoor units each designated as a master unit in each group of indoor units. Therefore, the centralized controller cannot control a start, a stop or the like of each indoor unit as a slave unit though it is connected to indoor units as slave units through signal lines.

In the case of controlling various kinds of operations of one indoor unit as a slave unit, an administrator or the like searches for the master indoor unit of the group to which the slave unit belongs and then the centralized controller transmits an operation signal or the like to the indoor unit.

Further, at the time of installing the indoor units, it is required to enter data on respective groups to which respective indoor units belong into the centralized controller. Such entry procedures have been made manually by the administrator or the like.

In such manual entry procedures, however, it costs much in time and effort to carry out an installation work and a test running work. Particularly, large-scaled buildings have a large number of indoor units to be installed thereby requiring extremely troublesome efforts for the manual entry procedures.

In addition, the manual entry procedures may cause entry errors. When an entry error occurs, there is a problem that a required indoor unit may not be operated in spite of execution of an operation control to the indoor unit.

This invention has been made in view of the above problems, and has its object of eliminating time and efforts in entering data on groups to which indoor units for air conditioning belong and previously preventing generation of entry errors.

DISCLOSURE OF INVENTION

Figure 1:
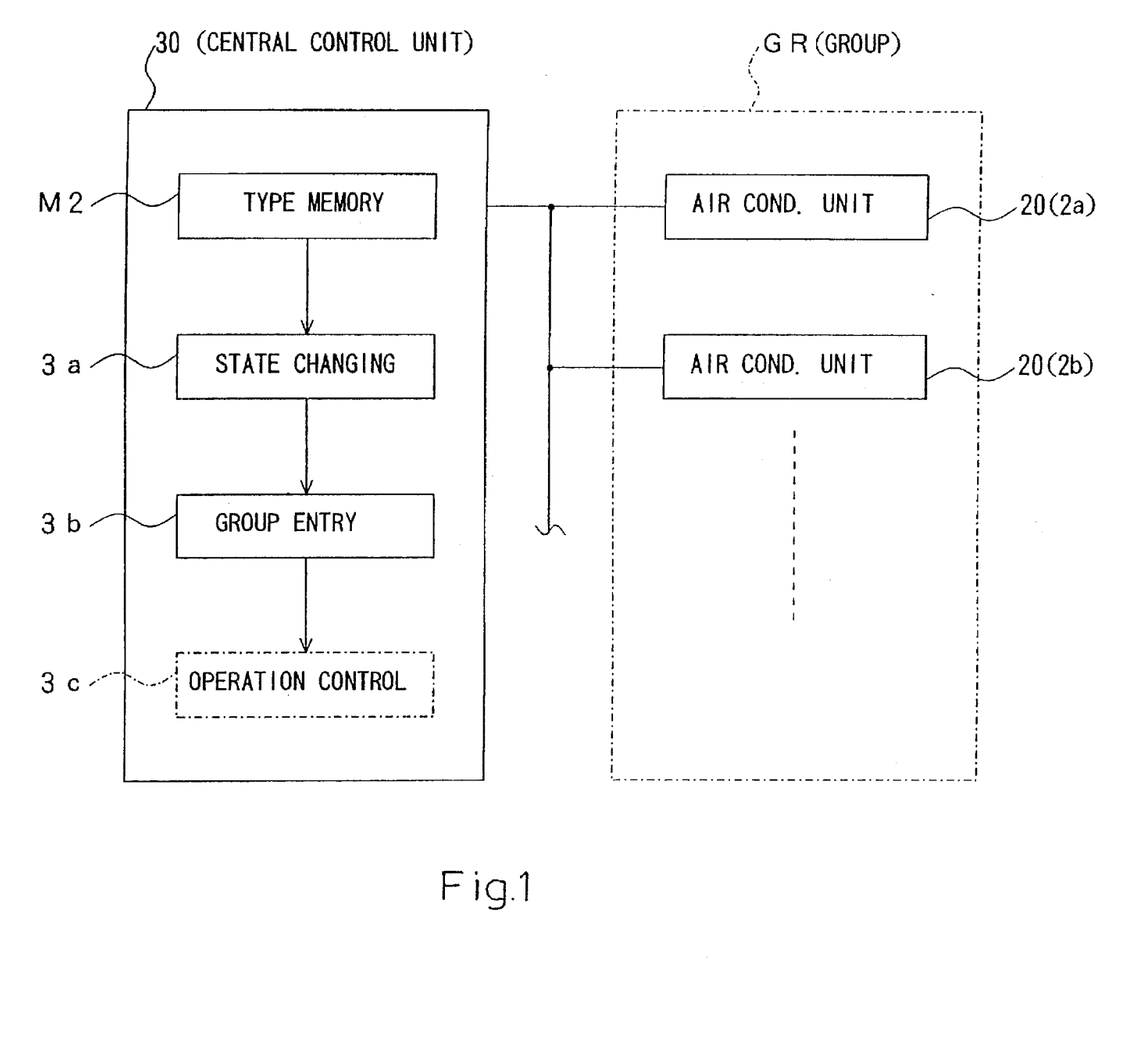
FIG. 1 is a block diagram showing the structure of the present invention.

To attain the above object, a measure taken in the present invention is to execute automatic entries of data on groups to which air conditioning units belong.
Constitution Specifically, as shown in FIG. 1, a measure taken in the invention of claim 1 premises a control device for air conditioner comprising: a plurality of air conditioning units (20, 20 ....) which are formed of a plurality of groups (GR) and are designated as a single master unit (2a) and at least one slave unit (2b) operating in association with the master unit (2a) in each of the groups (GR); and a central control unit (30) which is connected to all the air conditioning units (20, 20, ...) and communicates various kinds of control signals including state signals representing states of the air conditioning units (20, 20, ...) with each of the air conditioning units (20, 20, ...).

The central control unit (30) is provided with type memory means (M2) for receiving from each of the air conditioning units (20, 20, ...) type data for discriminating between the master unit (2a) and the slave unit (2b) to store the type data in every air conditioning unit (20, 20, ...).

Further, the central control unit (30) is provided with state changing means (3a) for responding to a process signal for identifying the group to which each air conditioning unit (20) belongs to transmit, based on the type data of the type memory means (M2), a change signal for changing a state of each air conditioning unit (20) to the air conditioning unit (20) as a master unit (2a) in the stop modes of all the air conditioning units (20, 20, ...).

In addition, the central control unit (30) is provided with group entry means (3b) for receiving a state signal from each of the air conditioning units (20, 20, ...) to determine that the air conditioning units (20, 20, ...) having changed its states in response to the change signal form one of the groups (GR) and execute an entry of the determination result.

Further, a measure taken in the invention of claim 2 is so composed that the central control unit (30) includes operation control means (3c) for receiving a control signal for one air conditioning unit (20) to output a control signal to the air conditioning unit (20) as a master unit (2a) of the group (GR) to which the air conditioning unit (20) to be controlled belongs and which has been entered by the group entry means (3b).
Operations Under the above-mentioned structure, in the invention of claim 1, the central control unit (30) first collects, at the time of installation or the like, type data on whether each air conditioning unit (20) is a master unit (2a) or a slave unit (2b) based on a process signal when entering data on the group to which each air conditioning unit belongs. For example, in each group (GR) of air conditioning units (20), the air conditioning unit (20) having the smallest unit number is designated as a master unit (2a) and other air conditioning units (20) are each designated as a slave unit (2b). Accordingly, each air conditioning unit (20) transmits its type data on that it is a master unit (2a) or a slave unit (2b) to the central control unit (30), and the central control unit (30) collects the items of type data and writes data on that each air conditioning unit (20) is a master unit (2a) or a slave unit (2b) on the type memory means (M2) based on the type data.

Thereafter, the state changing means (3a) makes operations of all the air conditioning units (20, 20, ...) into stop modes and then selects and retrieves an air conditioning unit (20) as a master unit (2a) out of all the air conditioning units (20, 20, ...).

Subsequently, the state changing means (3a) transmits a change signal, for example, a start signal, to the air conditioning unit (20) which is the master unit (2a). When the air conditioning unit (20) which is the master unit (2a) begins to operate, other air conditioning units (20, 20, ...) as slave units (2b) of the group (GR) to which the air conditioning unit (20) which is the master unit (2a) belongs begin to operate in association with the master unit (2a). Accordingly, the group entry means (3b) determines whether or not any other air conditioning units (20) having begun to operate exist.

More specifically, the central control unit (30) receives state signals, e.g., various kinds of operation mode signals, from all air conditioning units (20, 20, . . . ) including slave units (2b), and selects an air conditioning unit (20) as a slave unit (2b) operating in association with an operation of one air conditioning unit (20) as a master unit (2a) based on the state signals from all the air conditioning units (20).

Then, when the air conditioning unit (20) operating in association with the air conditioning unit (20) as a master unit (2a) exists, the group entry means (3b) determines that the air conditioning unit (20) belongs to the same group (GR) to which the master unit (2a) belongs, and executes an entry of a group number with respect to the air conditioning unit (20). The group entry means (3b) repeats the above process to execute entries of group numbers with respect to all the air conditioning units (20) as slave units (2b).

Further, the central control unit (30) selects and retrieves the next air conditioning unit (20) as a master unit (2a) and executes entries of group numbers of other air conditioning units (20) as slave units (2b) of the group (GR) to which the air conditioning unit (20) which is the master unit (2a) belongs in the above-mentioned manner.

The change signal may be a signal for changing a temperature setting, a signal for changing over between cooling and heating operations or the like.

Further, in the invention of claim 2, the operation control means (3c) determines whether a control signal is inputted to one air conditioning unit (20), for example, determines whether an operating button for an air conditioning unit (20) of an air conditioning unit address n has been pushed from the central control unit (30). When the operating button has been pushed, the operation control means (3c) determines whether the air conditioning unit (20) in question is a master unit (2a). When the air conditioning unit (20) is a slave unit (2b), the operation control means (3c) searches for an air conditioning unit (20) as a master unit (2a) belonging to the same group (GR) to which the determined air conditioning unit (20) belongs based on the entered group number.

Thereafter, the operation control means (3c) transmits a start signal to the air conditioning unit (20) as a master unit (2a) of the group (GR) to which the air conditioning unit (20) whose operating button has been pushed belongs, and initiates all the air conditioning units (20, 20, . . . ) of the group (GR), so that a control is completed.

The start signal may be substituted by a control signal such as a signal for changing over between cooling and heating operations.

Effects

According to the invention of claim 1, since the central control unit (30) is provided with state changing means (3a) and group entry means (3b) to execute automatic entries of all the groups (GR) of air conditioning units (20, 20, . . . ), it is not necessary to enter each of the groups manually as in the conventional manner so that entry procedures can be eliminated.

As a result, at the time of installation and test run of the air conditioner, working steps can be simplified thereby increasing working efficiencies.

Further, since generation of entry errors can be previously prevented, a specified air conditioning unit (20) can be securely controlled.

According to the invention of claim 2, when an operation command is issued to an air conditioning unit (20) as a slave unit (2b), since the operation control means (3c) transmits a control signal to an air conditioner (20) as a master unit (2a) of the same group (GR) which has been entered by the group entry means (3b) and the group (GR) is automatically entered, an accurate operation control can be effected.

BEST MODE FOR CARRYING OUT THE INVENTION

Detailed description will be made below about an embodiment of the present invention with reference to the drawings.

Figure 2:
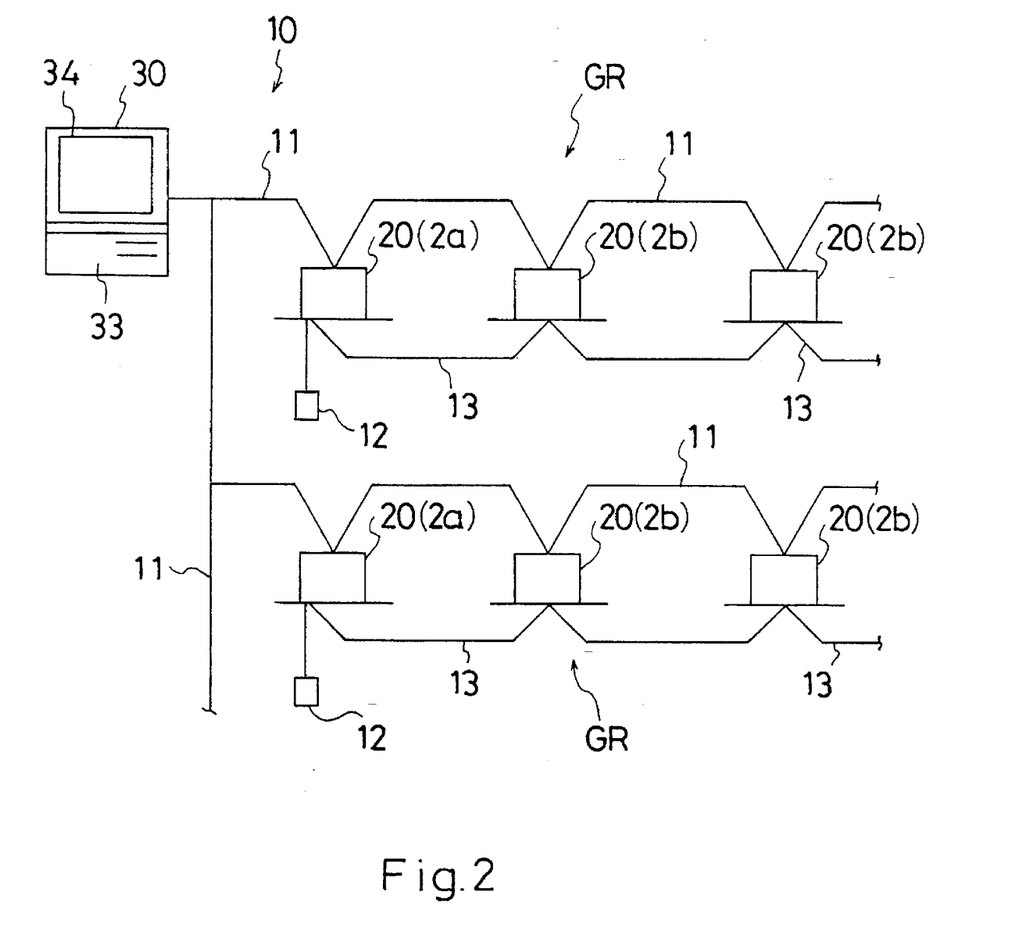
FIG. 2 is a diagram showing a system configuration of an air conditioner.

FIG. 2 schematically shows a system configuration of an air conditioner (10). In the air conditioner (10), a plurality of indoor units (20, 20, . . . ) are connected to a single central monitor board (30) through signal lines (11) so as to transmit and receive control signals between the central monitor board (30) and each of the indoor units (20, 20, . . . ).

The indoor units (20, 20, . . . ) are connected to an outdoor unit or outdoor units through refrigerant pipes, though these elements are not shown, thereby forming one or a plurality of refrigerant circuits. Control signals such as stare signals are transmitted and received between the outdoor unit and the indoor units (20, 20, . . . ) which form each of the refrigerant circuits.

Further, each of the indoor units (20, 20, . . . ) is connected to a remote controller (12) through a signal line (13). Every group of indoor units (20, 20, . . . ) connected to one remote controller (12) forms one remote control group (GR). A plurality of indoor units (20, 20, . . . ) forming each remote control group (GR) are collectively subjected to controls for various kinds of operations.

Figure 3:
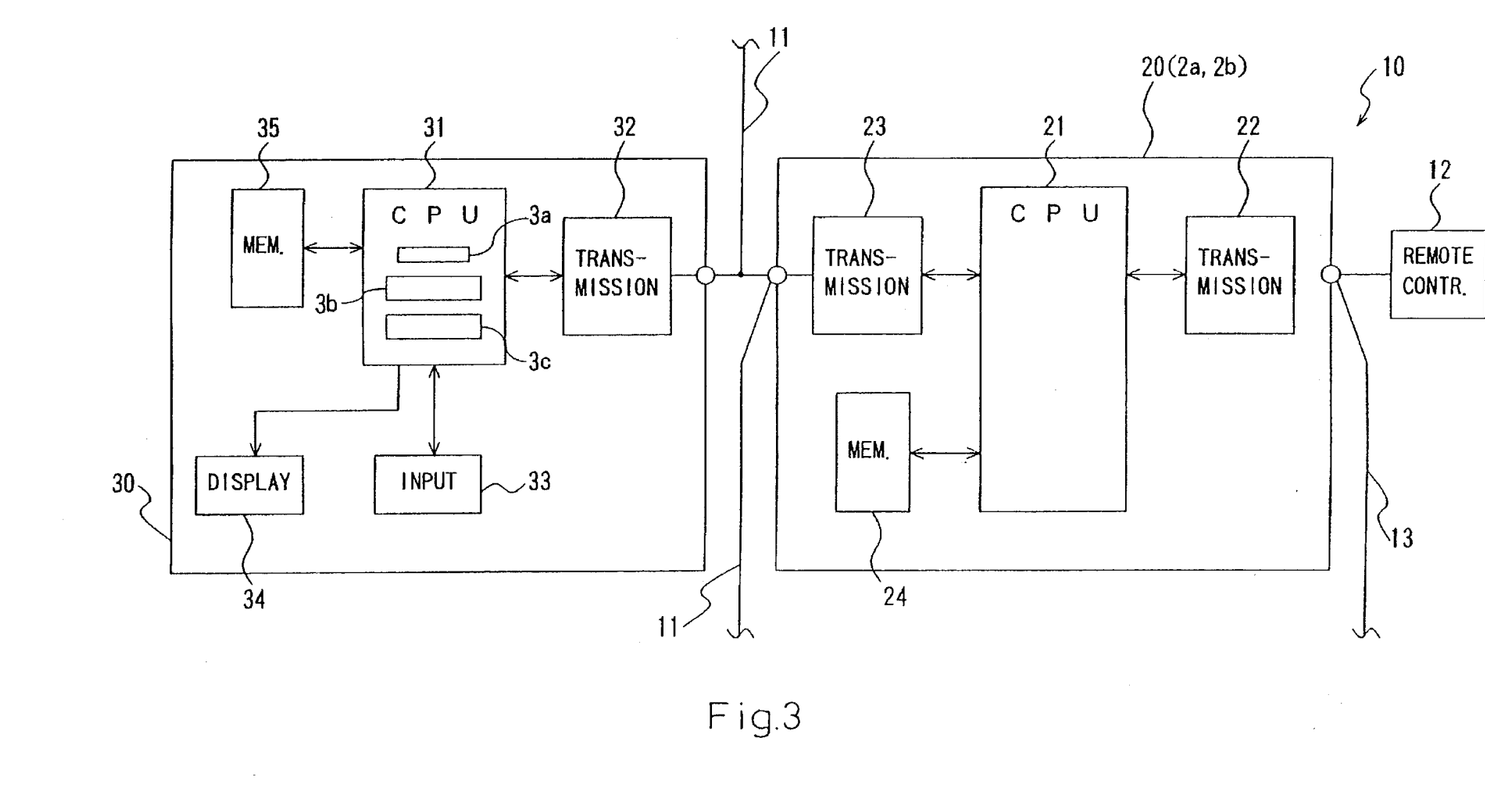
FIG. 3 is a block diagram of an indoor unit and a central monitor board.

As shown in FIG. 3, each indoor unit (20) forms an air conditioning unit having a CPU (21). The CPU (21) is connected to the remote controller (12) and the central monitor board (30) through transmission circuits (22, 23) respectively to send and receive control signals, and is connected to a memory (24). The memory (24) is so composed as to store a unit number of itself, information on various kinds of operations and the like.

Further, in the indoor units (20, 20, . . . ) of each remote control group (GR), one indoor unit (20) is designated as a master unit (2a) and other indoor units (20, 20, . . . ) are designated as slave units (2b). For the indoor unit (20) as a master unit (2a), for example, an arbitrary indoor unit (20) is selected out of the indoor units (20, 20, . . . ) forming the remote control group (GR).

As shown in FIG. 3, the central monitor board (30) forms a central control unit having a CPU (31). The CPU (31) is connected to each of all the indoor units (20, 20, . . . ) through a transmission circuit (32) and is connected to an input section (33), a display (34) and a memory (35). The CPU (31) is so composed as to transmit control signals such as a command signal for activation or deactivation and a command signal For setting a temperature to each of the indoor units (20, 20, . . . ) and receive control signals such as state signals representing a running, stop, cooling or heating mode from each of the indoor units (20, 20, . . . ).

The input section (38) is so composed as to input a start signal, a stop signal and the like of each of the indoor units (20, 20, . . . ) and input a charge signal for calculation and display of an air conditioning charge or other signals.

The display (34) is so composed as to display a running or stop mode of each of the indoor units (20, 20, . . . ) and display data on various kinds of states of an air conditioning charge and the like.

Figure 4:
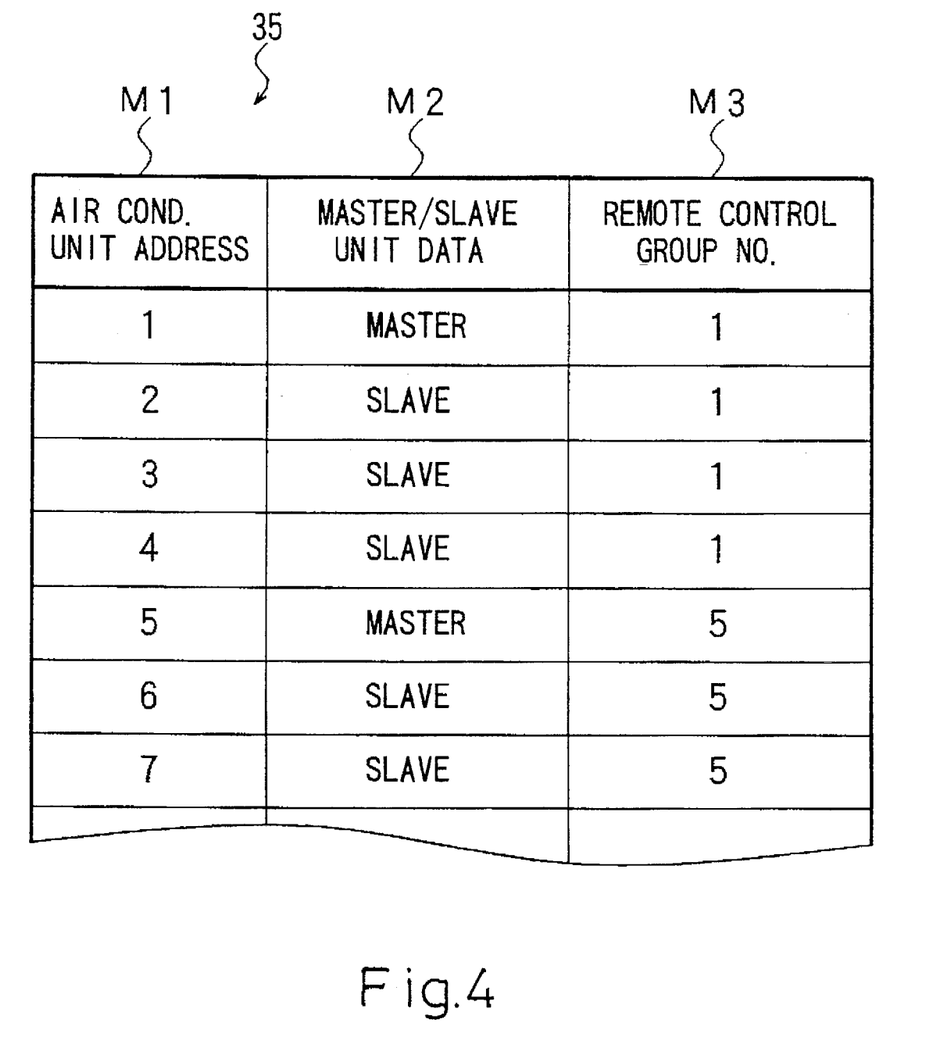
FIG. 4 is a diagram showing a memory area of a memory on the central monitor board.

As shown in FIG. 4, the memory (35) has at least an address area (M1), a type area (M2) and a group area (M3). The address area (M1) is so composed as to store air conditioning unit addresses which represent respective addresses of the indoor units (20, 20, . . . ).

The type area (M2) forms a type memory means for receiving type data for discriminating whether each of the indoor units (20, 20, . . . ) is a master unit (2a) or a slave unit (2b) from each indoor unit (20) to store type data which represents that each indoor unit (20) is a master unit (2a) or a slave unit (2b).

The group area (M3) is so composed as to store group numbers representing groups to which the indoor units (20, 20, . . . ) respectively belong.

Further, the CPU (31) includes a state changing means (3a), a group entry means (3b) and an operation control means (3c). The state changing means (3a) is so composed as to respond to a process signal for identifying a group to which an indoor unit belongs and transmit, based on type data of the type area (M2), a change signal for changing a state of each of the indoor units (20, 20, . . . ) to an indoor unit (20) as a master unit (2a) of the group. For example, when all the indoor units (20, 20, . . . ) are in the stop modes and a test running button of the input section (33) is pushed, the state changing means (3a) transmits to each indoor unit (20) as a master unit (2a) a start signal for changing the operation mode from a stop mode to a running mode.

The group entry means (3b) is so composed as to receive a state signal from each of the indoor units (20, 20, . . . ) thereby determining that the indoor units (20, 20, . . . ) having changed its states in response to the change signal of the state changing means (3a) form one remote control group (GR) and then entering the determination result into the group area (M3). For example, the group entry means (3b) determines that the indoor units (20, 20, . . . ) having begun to operate according to a start signal form one remote control group (GR) and enters the determination result into the group area (M3).

The operation control means (3c) is so composed as to receive a control signal for one indoor unit (20) to output a control signal to the indoor unit (20) as a master unit (2a) of the remote control group (GR) to which the indoor unit (20) to be controlled belongs and which has been entered by the group entry means (3b). For example, when an operating button for one slave unit (2b) is pushed, the operation control means (3c) transmits a start signal to the master unit (2a) of the remote control group (GR) to which the slave unit (2b) belongs to initiate all the indoor units (20, 20, . . . ) of the remote control group (GR).

Operations such as group entry

Figure 5:
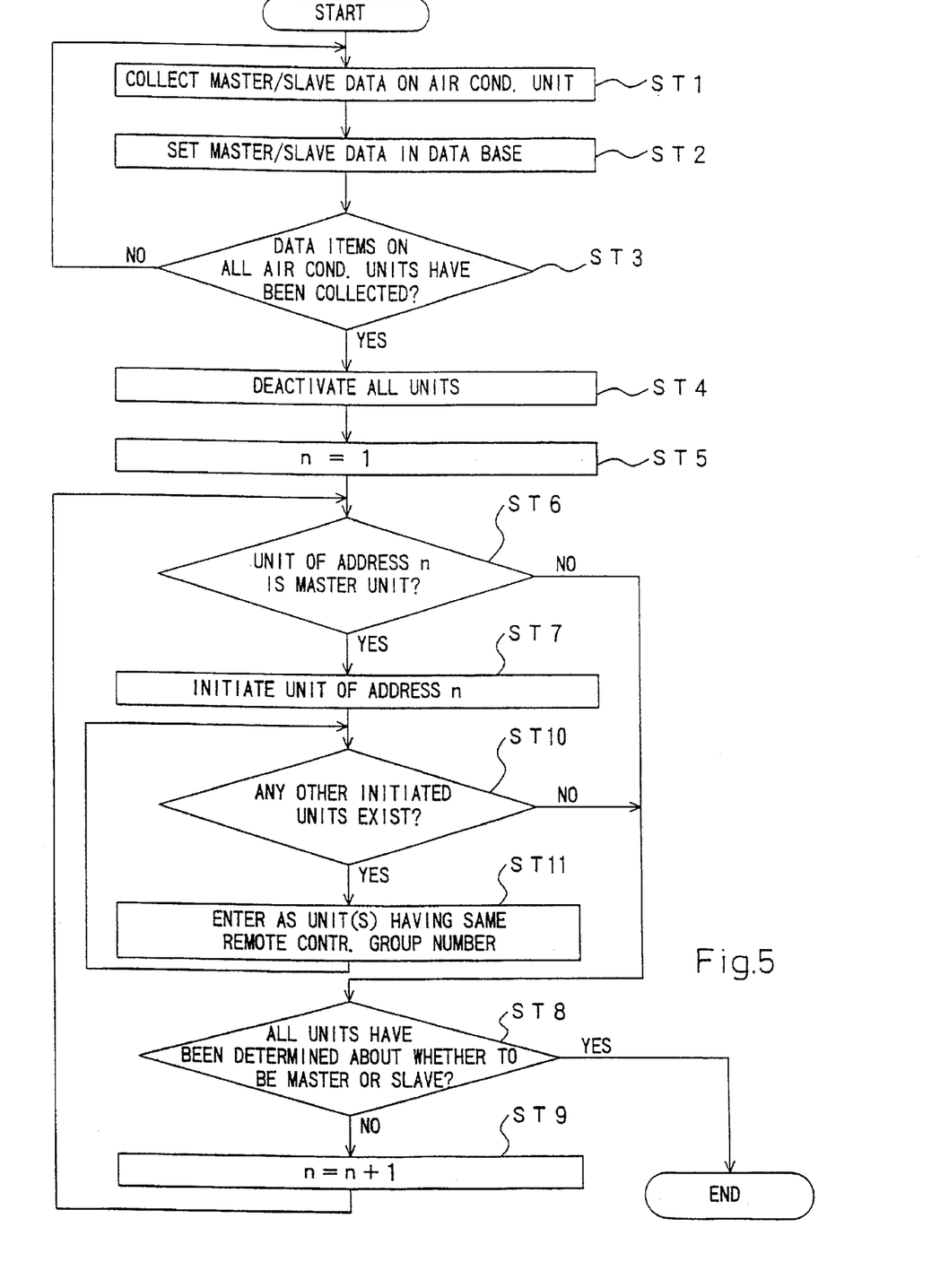
FIG. 5 is a control flow chart showing a control for group entry.

Next, description is made about a group entry operation for a remote control group (GR) in the above-mentioned air conditioner (10) with reference to FIG. 5.

First, at the time of installation or the like, when the test running button of the input section (33) of the central monitor board (30) is pushed, processing for group entry is initiated according to a process signal for group entry.

In step ST1, the central monitor board (30) collects type data representing that each indoor unit (20) as an air conditioning unit is a master unit (2a) or a slave unit (2b). More specifically, out of all indoor units (20, 20, . . . ) belonging to a remote control group (GR) connected to one remote control (12), an indoor unit (20) having the smallest unit number is designated as a master unit (2a) and other indoor units (20, 20, . . . ) are each designated as a slave unit (2b). Accordingly, each of the indoor units (20, 20, . . . ) transmits type data of itself, representing that it is a master unit (2a) or a slave unit (2b), to the central monitor board (30) so that the central monitor board (30) collects such type data.

Subsequently, the routine proceeds to step ST2, wherein the central monitor board (30) writes on the type area (M2) information representing that each of the indoor units (20, 20, . . . ) is a master unit (2a) or a slave unit (2b) in accordance with the above type data. The routine then proceeds to step ST3, determines whether or not type data on all the indoor units (20, 20, . . . ) has been collected. Until type data on all the indoor units (20, 20, . . . ) is collected, the routine returns to step ST1 and repeats the above-mentioned operation.

Thereafter, when type data on all the indoor units (20, 20, . . . ) has been collected, the routine proceeds From step ST3 to step ST4, wherein the state changing means (3a) deactivates operations of all the indoor units (20, 20, . . . ).

Subsequently, the routine proceeds to step ST5, sets an air conditioning unit address n to "1" and then proceeds to step ST6, wherein it is determined whether the indoor unit (20) of the air conditioning unit address n is a master unit (2a). When the indoor unit (20) of the air conditioning unit address n; that is, the indoor unit (20) whose air conditioning unit address n is now "1", is a master unit (2a), the routine proceeds from step ST6 to step ST7 and transmits a start signal to the indoor unit (20) whose air conditioning unit address n is "1" to initiate the indoor unit (20). On the contrary, when the indoor unit (20) whose air conditioning unit address n is "1" is not a master unit (2a) but a slave unit (2b), the routine proceeds From step ST6 to step ST8 and determines whether all the indoor units (20, 20, . . . ) have been determined about whether to be a master unit (2a) or not to be.

When the determination with respect to all the indoor units (20, 20, . . . ) has not been yet finished, the routine proceeds from step ST8 to step ST9, increments the air conditioning unit address n by one and then returns to step ST6, wherein the above-mentioned operation is repeated and an indoor unit (20) as a master unit (2a) is selected and retrieved.

When the indoor unit (20) as a master unit (2a) is initiated in step ST7, the indoor units (20, 20, . . . ) as slave units (2b) of the same group (GR) to which the above indoor unit (20) as a master unit (2a) belongs also begin to operate in association with the above master unit (2a), so that the routine proceeds from step ST7 to step ST10. In step ST10, the group entry means (3b) determines whether or not other indoor units (20) having begun to operate exist.

In other words, since the central monitor board (30) receives, for calculation of total charge, state signals, e.g., various kinds of operation mode signals, from all the indoor units (20, 20, . . . ) including slave units (2b), it is possible to select indoor units (20) as slave units (2b) operating in association with an operation of one indoor unit (20) as a master unit (2a) based on the state signals from each of the indoor units (20, 20, ... ).

When an indoor unit (20) operating in association with the indoor unit (20) as a master unit (2a) exists, the routine proceeds from step ST10 to step ST11, wherein the group entry means (3b) determines that the former indoor unit (20) belongs to the same remote control group (GR) to which the latter indoor unit (20) belongs and enters the group number in the group area (M3). Then, the routine returns to step ST10 and repeats the above-mentioned determination to execute entries of group numbers of indoor units (20) as slave units (2b).

In step ST10, when the group entry for one remote control group (GR) is completed, the determination becomes NO so that the routine returns to step ST8 and executes the above-mentioned operation, that is, retrieves the next indoor unit (20) as a master unit (2a) and executes entries of group numbers of indoor units (20, 20, ... ) as slave units (2b) of the same remote control group (GR) to which the next indoor unit (20) as a master unit (2a) belongs in the same manner as above-mentioned.

In a concrete example, as shown in FIG. 4, if an indoor unit (20) whose air conditioning unit address is "1" is a master unit (2a) and indoor units (20) as slave units (2b) operating in association with the master unit (2a) have respective air conditioning unit addresses of "2, 3, 4", all the group numbers of these indoor units (20, 20, 20, 20) are entered as "1".

If an indoor unit (20) whose air conditioning unit address is "5" is a master unit (2a) and indoor units (20) as slave units (2b) operating in association with the master unit (2a) have respective air conditioning unit addresses of "6, 7", all the group numbers of these indoor units (20, 20, 20) are entered as "5".

Thereafter, when group entry for all the indoor units (20, 20, ... ) is finished, the determination in step ST8 becomes YES so that the group entry process is completed.

Figure 6:
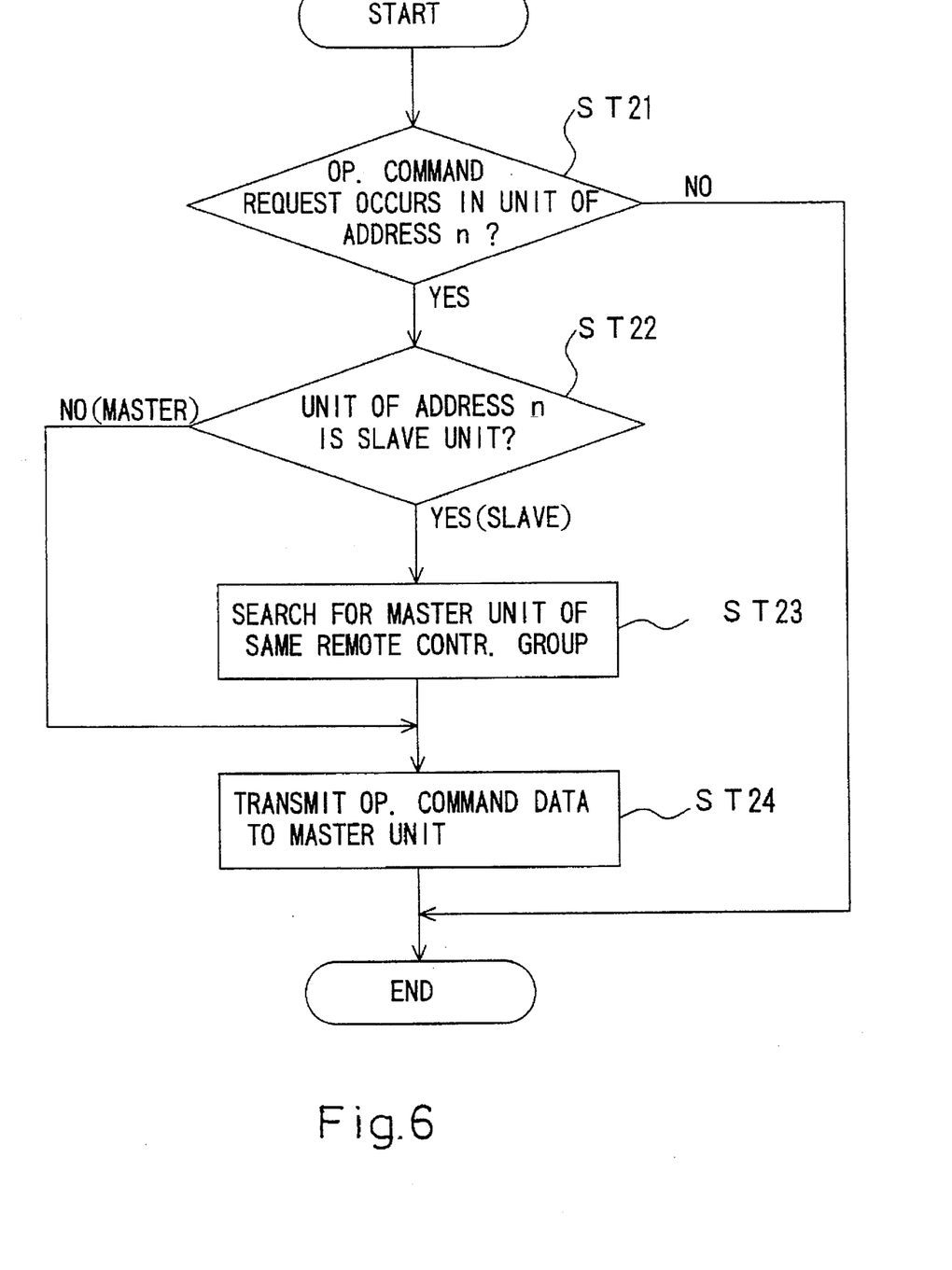
FIG. 6 is a control flow chart showing an operation control.

When all indoor units (20, 20, ... ) are under operation control, the operation control means (3c) operates as shown in FIG. 6.

First, in step ST21, it is determined whether or not a request that commands an operation occurs in an indoor unit (20) of an air conditioning unit address n and whether or not an operating button of the indoor unit (20) of the air conditioning unit address n has been pushed from the input section (33) of the central monitor board (30). When the operating button is not pushed, the operation control means (3c) finishes the control.

On the contrary, when the operating button for the indoor unit (20) of the air conditioning unit address n has been pushed from the input section (33) of the central monitor board (30), the routine proceeds from step ST21 to seep ST22, in which it is determined whether or not the indoor unit (20) of the air conditioning unit address n is a master unit (2a). When the indoor unit (20) is a slave unit (2b), the routine proceeds from step ST22 to step ST23, in which data is searched for an indoor unit (20) as a master unit (2a) of the same remote control group (GR) based on the group number entered in the group area (M3).

Thereafter, the central monitor board (30) transmits a signal to an indoor unit (20) as a master unit (2a) of the remote control group (GR) to which the indoor unit (20) as a slave unit (2b) whose operating button has been pushed belongs, so that the operation control means (3c) initiates all indoor units (20, 20, ... ) of the one remote control group (GR) and finishes the control.

When it is determined in step ST22 that the indoor unit (20) whose operating button has been pushed is a master unit (2a), the determination becomes YES so that the routine proceeds to seep ST24, in which the operation control means (3c) initiates all the indoor units (20, 20, ... ) of the remote control group (GR) to which the above indoor unit (20) belongs and finishes the control.

In a concrete example, when an operating button has been pushed for the indoor unit (20) of FIG. 4 whose air conditioning unit address n is "3", since the indoor unit (20) belongs to the remote control group (GR) of the group number "1", a start signal is transmitted to the indoor unit (20) as a master unit (2a) whose air conditioning unit address n is "1". As a result, the indoor units (20, 20, ... ) belonging to the remote control group (GR) of the group number "1", i.e., the indoor units (20, 20, ... ) whose respective air conditioning unit addresses n are "1, 2, 3, 4", begin to operate.

Effects of the embodiment

According to the present embodiment, since the central monitor board (30) is provided with a state changing means (3a) and a group entry means (3b) to execute automatic entries of remote control groups (GR) for all indoor units (20, 20, ... ), it is not necessary to manually enter each of the groups as in the conventional manner thereby eliminating entry procedures.

As a result, at the time of installation or test running work, working steps can be simplified thereby increasing working efficiencies.

Further, since generation of entry errors can be previously prevented, a specified indoor unit (20) can be securely controlled.

Furthermore, when an operation command is issued to an indoor unit (20) as a slave unit (2b), since the operation control means (3c) transmits an operation signal to an indoor unit (20) as a master unit (2a) belonging to the same remote control group (GR) entered by the group entry means (3b) and the remote control group (GR) is automatically entered, an operation control can be accurately executed.

Other modifications

In the present embodiment, the state changing means (3a) transmits a start signal to an indoor unit (20) as a master unit (2a). In the present invention, however, a signal to be transmitted is not limited to a start signal, i.e., may be a change signal for changing a temperature setting or may be a change signal for changing over between cooling and heating operations. In other words, since The central monitor board (30) monitors states of all indoor units (20, 20, ... ), it is essential only that the signal to be transmitted is a signal for changing the state of an indoor unit (20) as a slave unit (2b) in accordance with the state change of the indoor unit (20) as a master unit (2a).

Further, a control signal of the operation control means (3c) is not limited to a start signal, i.e., may be a signal for changing over between cooling and heating operations or other signals. It is a matter of course that the control signal may be a signal for controlling an operation mode.

Industrial Applicability

As mentioned so far, according to an operation control device for air conditioner of the present invention, a plurality of indoor units are identified in units of groups, the identification data is entered in a central monitor board and their operations and the like are controlled in every group from the central monitor board. Accordingly, in the case that a number of indoor units are disposed in a large-scaled building or the like, all the indoor units can be accurately controlled.

We claim:

1. A control device for air conditioner comprising:

a plurality of air conditioning units (20, 20, . . . ) which are formed of a plurality of groups (GR) and are designated as a single master unit (2a) and at least one slave unit (2b) operating in association with said master unit (2a) in said each group (GR); and a central control unit (30) which is connected to all the air conditioning units (20, 20, . . . ) and communicates various kinds of control signals including state signals representing states of said air conditioning units (20, 20, . . . ) with said each air conditioning unit (20, 20, . . . ), said central control unit (30) comprising:

type memory means (M2) for receiving from said each air conditioning unit (20, 20, . . . ) type data for discriminating between the master unit (2a) and the slave unit (2b) to store the type data in every air conditioning unit (20, 20, . . . );

state changing means (3a) for responding to a process signal for identifying the group to which said each air conditioning unit (20) belongs to transmit, based on the type data of said type memory means (M2), a change signal for changing a state of said each air conditioning unit (20) to said air conditioning unit (20) as a master unit (2a) in the stop modes of all the air conditioning units (20, 20, . . . ); and group entry means (3b) for receiving a state signal from said each air conditioning units (20, 20, . . . ) to determine that said air conditioning units (20, 20, . . . ) having changed their states in response to the change signal form one of said groups (GR) and executing an entry of the determination result.

2. A control device for air conditioner according to claim 1, wherein said central control unit (30) includes operation control means (3c) for receiving a control signal for one air conditioning unit (20) to output a control signal to the air conditioning unit (20) as a master unit (2a) of the group (GR) to which said air conditioning unit (20) to be controlled belongs and which has been entered by said group entry means (3b).

* * * * *